United States Patent [19]

McAlpine et al.

[11] Patent Number: 6,070,219
[45] Date of Patent: *May 30, 2000

[54] HIERARCHICAL INTERRUPT STRUCTURE FOR EVENT NOTIFICATION ON MULTI-VIRTUAL CIRCUIT NETWORK INTERFACE CONTROLLER

[75] Inventors: Gary Lester McAlpine, Beaverton; Greg John Regnier, Portland, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/728,514

[22] Filed: Oct. 9, 1996

[51] Int. Cl.[7] .................................................... G06F 13/00
[52] U.S. Cl. .......................... 710/263; 710/267; 710/269; 769/250; 370/230
[58] Field of Search ................................. 395/200.3, 736, 395/200.6, 200.66; 709/212, 250, 253, 223; 370/230; 710/260–269

[56] References Cited

U.S. PATENT DOCUMENTS

| | | | |
|---|---|---|---|
| 5,410,708 | 4/1995 | Miyamori | 710/264 |
| 5,471,618 | 11/1995 | Isfeld | 395/839 |
| 5,475,860 | 12/1995 | Ellison et al. | 395/846 |
| 5,490,134 | 2/1996 | Fernandes et al. | 370/466 |
| 5,524,007 | 6/1996 | White et al. | 370/85.11 |
| 5,535,420 | 7/1996 | Kardach et al. | 710/48 |
| 5,588,125 | 12/1996 | Bennett | 710/126 |
| 5,664,116 | 9/1997 | Gaytan et al. | 395/200.64 |
| 5,675,829 | 10/1997 | Oskouy et al. | 395/826 |
| 5,682,478 | 10/1997 | Watson et al. | 395/200.12 |
| 5,732,082 | 3/1998 | Wartski et al. | 370/395 |
| 5,745,790 | 4/1998 | Oskouy | 395/853 |
| 5,751,951 | 5/1998 | Osborne et al. | 395/200.8 |
| 5,778,180 | 7/1998 | Gentry et al. | 395/200.42 |
| 5,796,735 | 8/1998 | Miller et al. | 370/395 |
| 5,802,287 | 9/1998 | Rostoker et al. | 395/200.8 |
| 5,867,480 | 2/1999 | Thomas et al. | 370/230 |

OTHER PUBLICATIONS

PCI System Architecture Chapter 11, 1995.

*Primary Examiner*—Paul R. Myers
*Attorney, Agent, or Firm*—Kenyon & Kenyon

[57] ABSTRACT

Methods and apparatus process a plurality of interrupt status words from a network interface controller (NIC) to a plurality of processes. A first per-virtual circuit interrupt status word and a second per-virtual circuit interrupt status word can be sent by a per-virtual circuit interrupter having a per-virtual circuit interrupt output. A NIC interrupter can be in communication with the per-virtual circuit interrupt output and have a NIC interrupt output to send a first NIC interrupt status word and a second NIC interrupt status word to a global interrupt queue of a host system. The NIC interrupter can generate an interrupt signal to the host system, and a proxy interrupt handler of the host system can be in communication with the NIC interrupter. The proxy interrupt handler can awaken at least in part in response to the interrupt signal, and read the first NIC interrupt status word and the second NIC interrupt status word from the global interrupt queue, wake the first process and the second process, and send the first NIC interrupt status word to the first process and the second NIC interrupt status word to the second process.

22 Claims, 6 Drawing Sheets

HIERARCHICAL INTERRUPT STRUCTURE FOR EVENT NOTIFICATION ON MULTI-VIRTUAL CIRCUIT NETWORK INTERFACE CONTROLLER

FIELD OF THE INVENTION

The present invention relates generally to multi-computer networks, and more specifically to interrupt generation within a network node having a multi-virtual circuit network interface controller.

BACKGROUND INFORMATION

For packetized data communications in a multi-computer network, virtual circuits (also known as "virtual connections") are established between processes running on various nodes within the network. Each virtual circuit forms a communications path between two such processes, which are often running on separate nodes. In those nodes having multitasking operating systems, multiple processes can be executing simultaneously. Thus, at any given time, a particular node in a multi-computer network may interface with multiple virtual circuits, each of which is associated with a particular process running on that node and ties that process to a corresponding process on another node.

Conventionally, the interface between a particular node (hereinafter sometimes referred to as the "host node") and the network has been a single channel interface. That is, even when multiple virtual circuits (and thus multiple data streams) simultaneously interface with a particular node, all incoming and outgoing data packets for the host node are channeled through a single hardware connection at the interface between the network and the node. The multiplexing and demultiplexing of the data streams to and from the multiple processes running on the host node has conventionally been handled by the host node's operating system (i.e., kernel level software). Thus, communication ordinarily has been handled by hardware interrupts to the operating system whenever a data packet, associated with a particular process on the host node, is received, or whenever a process on the host node desires to transmit a data packet via a virtual circuit to another node.

Consequently, during periods of heavy communication traffic in a conventional node, a large amount of operating system bandwidth is spent handling I/O interrupts. Furthermore, such systems are inefficient in that they require the bottlenecking of multiple data streams through a single interface.

The recently-developed multi-virtual circuit network interface controller (NIC), greatly reduces the strain on operating system bandwidth and, during times of high data traffic, eliminates the bottlenecking of data through a single interface, by providing the illusion of a dedicated network interface to multiple processes running on a given node simultaneously. These multiple "virtual" interfaces allow data communications to occur directly between the multiple processes running on the host node and the NIC without the intervention of the operating system kernel on the host node. Each active process on the host node may have one or more associated virtual interfaces. However, each virtual interface can be owned by only a single process. These processes may be running in user or kernel level space within the node.

Each virtual interface of the NIC includes two work queues in host memory which provide a two-way communication link between the NIC and a process on the host node. One work queue is for inbound data (the receive queue) and the other for outbound data (the send queue).

Data packet flow via a particular virtual interface is governed by the use of a stream of control information passing from the process to the NIC. The control information is contained in packet descriptors. Each incoming and outgoing data packet for a particular process is associated with a packet descriptor. Each packet descriptor is a small data structure which describes a packet and provides control information for the handling of that packet.

A descriptor is generated by a process, and placed into one of the process's two virtual interface work queues. The send and receive queues of a virtual interface are thus comprised of linked packet descriptors, with each descriptor describing either a packet to be transmitted from the process via the NIC onto the network or a packet to be received by the NIC from the network and written into a buffer of the receiving process.

For transmission of a data packet, the process puts a packet descriptor into the transmit queue and then informs the NIC, via a memory-mapped "send doorbell," that a data packet is ready and awaiting transmission. The NIC then reads the descriptor out of the queue, determines from the descriptor the amount, location and destination of the data packet to be transmitted, and processes the packet accordingly.

When a process is ready to receive a data packet from its associated virtual circuit, the process places a buffer descriptor into the receive queue and rings a memory-mapped "receive doorbell" to inform the NIC the buffer is available for receiving a packet. The control information in the packet describes the location of a buffer in user or kernel level memory for storing the incoming packet. The process may queue up a number of descriptors on the receive queue at a time, with each descriptor containing control information for a single incoming data packet.

The NIC processes the descriptors out of a process's receive queue sequentially. Upon the reception of a data packet for the process, the NIC uses the information contained in the descriptor to control the writing of the packet into memory. The NIC then writes a completion notification into the descriptor, and repeats this process of reading descriptors and storing packets in accordance therewith as long as the process continues to generate receive queue descriptors.

The process, in turn, utilizes the completion notifications in the descriptors to determine whether there are received data packets awaiting processing by the process. The process polls the descriptors in the receive queue to see which have been "completed" (i.e., have become associated with received packets placed in memory by the NIC). Through the polling of descriptors, then, the processes on the host node are able to bypass the operating system kernel and communicate directly with the NIC, and through the NIC with their virtual circuits.

Descriptor polling is a highly efficient means of handling data communication during periods of high data traffic. However, when the data traffic for a particular process is slow, it is an inefficient use of processing capability to have a process repeatedly polling for naught. Under these circumstances, then, it is desired to have an alternative means of handling data communication, one which reduces processor bandwidth waste. In addition, it is desired to provide application processes and the host with notification of significant events, such as, e.g., the occurrences of various error conditions.

One means of reducing processor overhead during times of slow or sporadic data traffic is through the use of hardware interrupts. A process which has, e.g., polled the receive queue a number of times and come up empty-handed, may wish to go to sleep and be awakened upon the happening of an event, such as, e.g., when one or more data packet descriptors in the receive queue have been completed by the NIC. In addition, a process and/or the host may need to be notified about an error or other significant event that has occurred. Event notification in these sorts of circumstances can be accomplished through the use of a hardware interrupt to the operating system, which triggers the operating system to, e.g., awaken a process or notify an application process of an error.

However, given the potentially thousands of virtual interfaces which can be active simultaneously, the generation of an interrupt to the operating system upon the happening of every event could inundate the operating system with context switching due to interrupts. Conversely, during times of low communications traffic, requiring the CPU to poll for events can waste an excessive amount of CPU cycles and system memory bandwidth. Furthermore, in a multitasking operating system, the polling process can get swapped out and not get swapped back in for a relatively long period of time. Consequently, a significant event may have to wait an unacceptable period of time to get serviced. Thus, is it desired to provide a capability for event notification which does not either inundate the operating system with interrupts or waste excessive CPU time event-polling.

In a node architecture employing a multi-virtual circuit NIC, there are a number of event types which can arise and about which a particular process may wish to be notified. For example, a process may wish to be notified of events relating to specific packet descriptors or to its virtual circuit. In addition, there are possible events which are not specific to a particular virtual circuit, i.e., events relating to the NIC in general, about which the host needs to be made aware. Thus, it is also desired to provide a flexible event notification capability which allows the enabling and generation of event notification from various levels within the node hierarchy (i.e., from the descriptor, virtual circuit and/or NIC levels).

SUMMARY OF THE INVENTION

Embodiments of the present invention provide methods and apparatus to process a plurality of interrupt status words from a network interface controller (NIC) to a plurality of processes. A per-virtual circuit interrupter having a per-virtual circuit interrupt output can send a first per-virtual circuit interrupt status word and a second per-virtual circuit interrupt status word. A NIC interrupter can be in communication with the per-virtual circuit interrupt output and have a NIC interrupt output to send a first NIC interrupt status word and a second NIC interrupt status word to a global interrupt queue of a host system. The NIC interrupter can generate an interrupt signal to the host system, and a proxy interrupt handler of the host system can be in communication with the NIC interrupter. The proxy interrupt handler can awaken at least in part in response to the interrupt signal, read the first NIC interrupt status word and the second NIC interrupt status word from the global interrupt queue, wake the first process and the second process, and send the first NIC interrupt status word to the first process and the second NIC interrupt status word to the second process.

DETAILED DESCRIPTION

The present invention provides a hierarchical interrupt structure for significant event reporting by the Network Interface Controller (NIC) of a node in a multi-computer network. The event reporting capability of the present invention combines hardware interrupts to the operating system kernel with polling of descriptors by processes to provide flexibility for operation under the wide variety of circumstances the NIC is likely to encounter.

Figure 1:
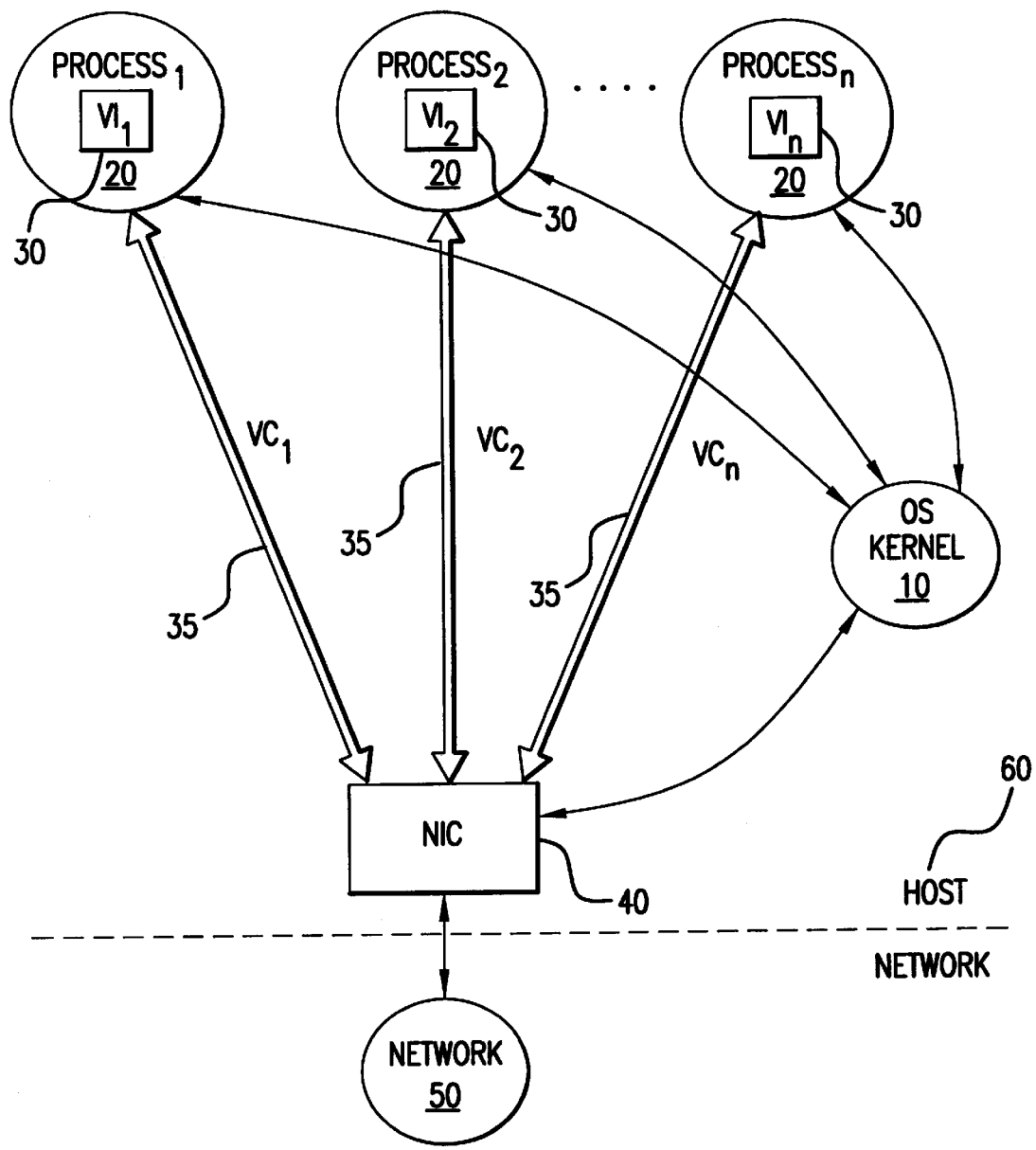
FIG. 1 is a high-level functional diagram of a host node according to the present invention.

Referring to FIG. 1, a NIC 40 on the host node 60 provides a communications interface between the host 60 and the network 50. Multiple user-level processes 20 on the host are able to interface with the NIC 40 via their corresponding virtual interfaces 30 and associated virtual circuits 35. Additionally, significant events can be reported to the host's operating system kernel 10 via interrupt status information passed to the kernel 10 by the NIC 40. The kernel 10 can then, in turn, report such events to the appropriate process(es) 20.

Figure 2:
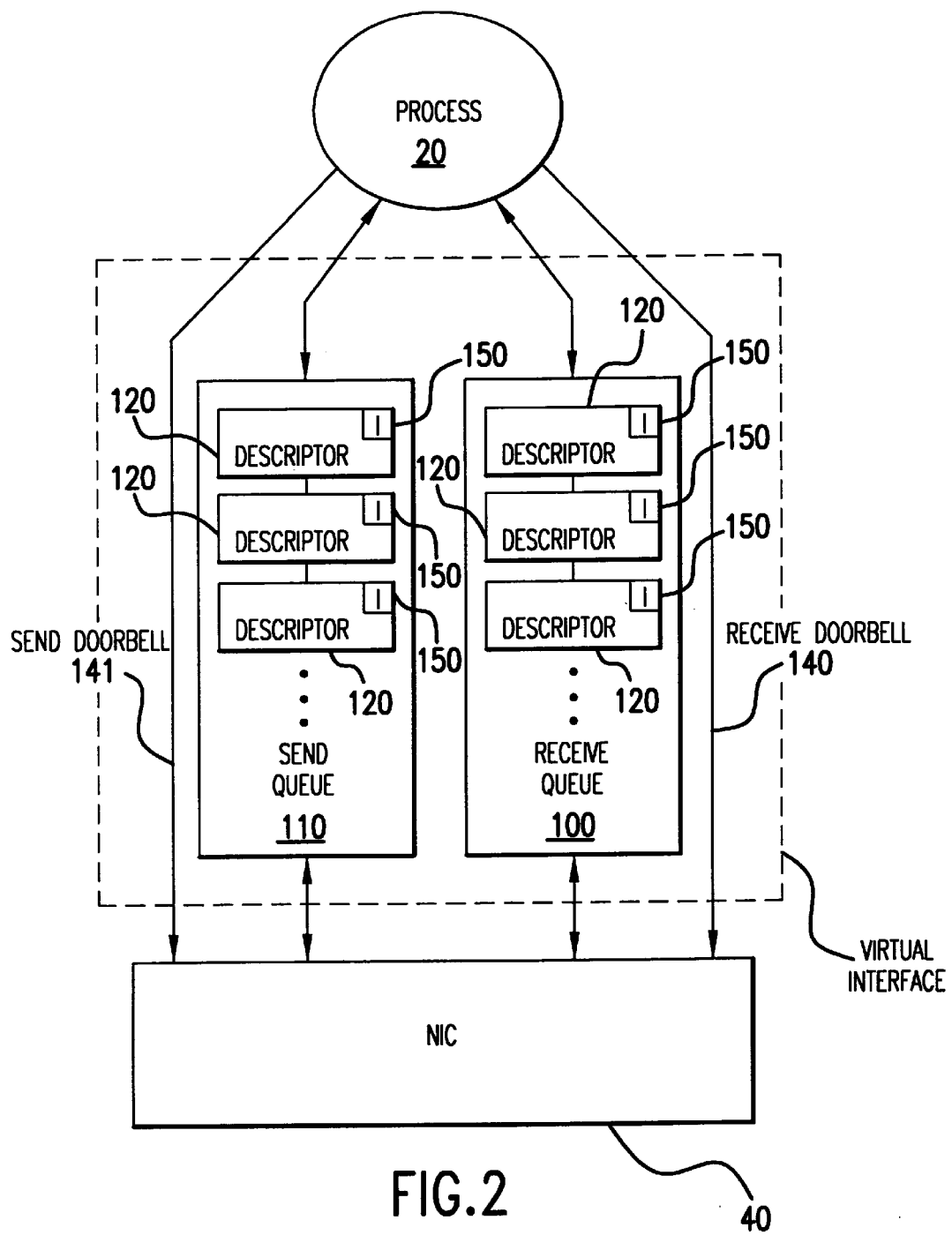
FIG. 2 is a diagram of a virtual interface between a host node process and the NIC according to the present invention.

FIG. 2 is a diagram of a virtual interface 30, for providing direct, two-way communication between a host node process 20 and the NIC 40. The virtual interface 30 includes two work queues: a send queue 110 and a receive queue 100. The send queue 110 contains packet descriptors 120 which describe packets to be sent over a particular virtual circuit. The receive queue 100 contains packets descriptors 120 used for buffering incoming packets on a particular virtual circuit 35. The send queue 110 and receive queue 100 reside in host physical memory.

Within each packet descriptor 120 are per-descriptor interrupt enables 150. The process 20 can selectively enable the generation of interrupts upon the happening of events related to one or more particular descriptors 120 by setting the appropriate bits within the per-descriptor interrupt enables 150 of those descriptors 120.

The virtual interface 30 also includes a send doorbell 141 and a receive doorbell 140. The send and receive doorbells 141, 140 allow the process 20 to notify the NIC 40 directly, via memory-mapped address space, of the placement of a packet descriptor 120 in the send queue 110 or receive queue 100. The NIC 40 writes completion status information into a descriptor 120 when a packet send or packet receive operation relating to that descriptor 120 has been completed.

Figure 3:
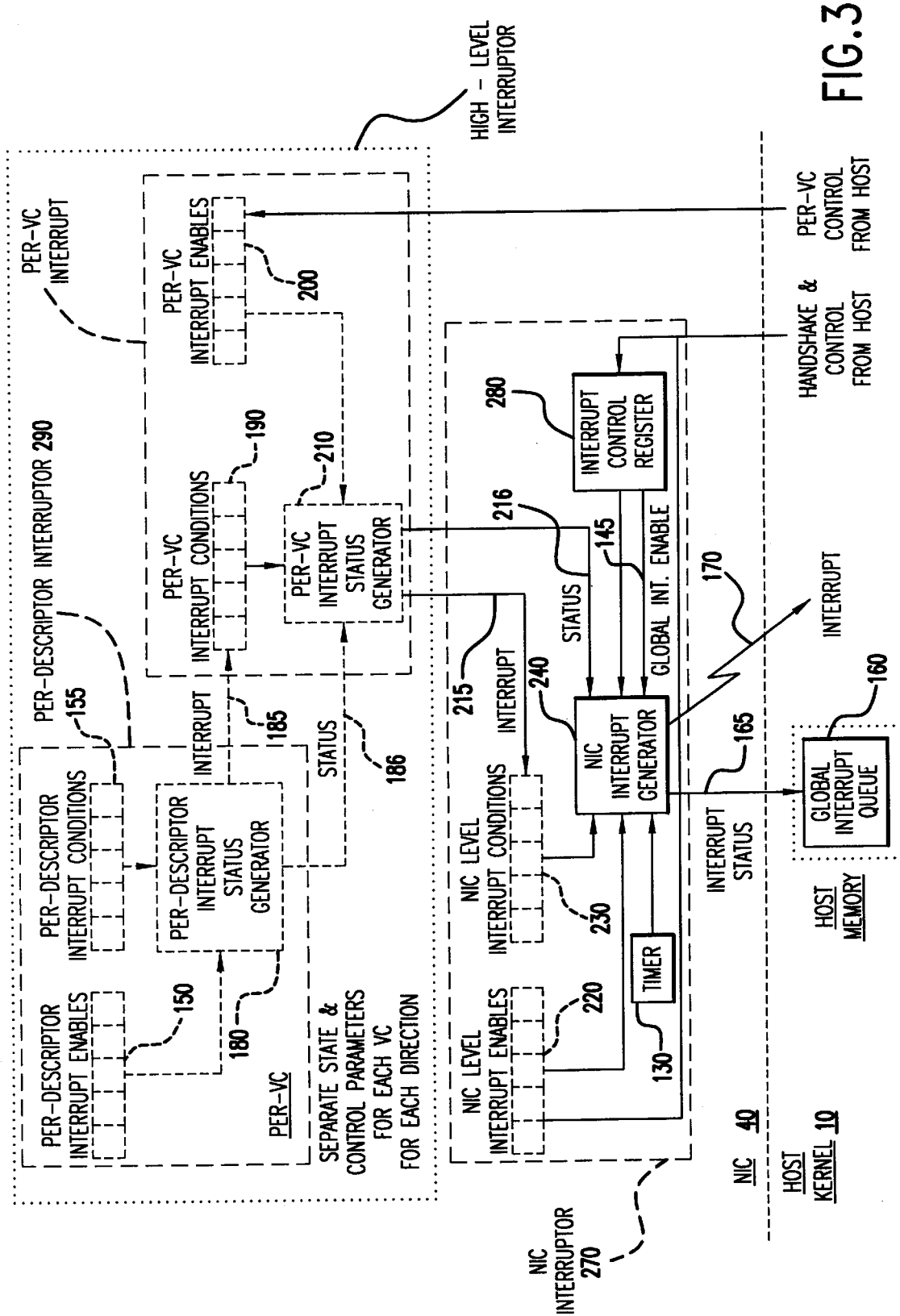
FIG. 3 depicts a flexible, hierarchical interrupt generation structure for significant event reporting by the NIC according to the present invention.

FIG. 3 depicts a hierarchical interrupt structure according to the present invention. The interrupt structure shown enables the reporting of events at 3 levels within the node hierarchy: (1) the packet descriptor level; (2) the virtual circuit level; and (3) the NIC level. As is discussed in more detail below, each level of the interrupt hierarchy provides a filter for interrupts from the previous level(s).

The generation of interrupts from the descriptor level of the interrupt generation hierarchy is handled by the per-descriptor interrupter 290. The per-descriptor interrupter 290 includes an array of per-descriptor interrupt conditions 155 and corresponding per-descriptor interrupt enables 150. Each per-descriptor interrupt condition 155 in the array represents a descriptor-specific event about which a particular process would like to be notified.

The per-descriptor events might include, for example, the writing of completion status information into a particular descriptor by the NIC upon the processing of an inbound or outbound packet. Thus, for example, a process which has polled its receive queue repeatedly and found no completed descriptors, might place ten descriptors into its receive queue, and set an interrupt enable bit relating to a completion condition in the tenth descriptor. Consequently, upon the reception and processing of the tenth new incoming packet for that process, the NIC will write a completion notification into the tenth descriptor which will trigger a descriptor completion interrupt.

The per-descriptor interrupt conditions 155 thus represent the array of possible descriptor-specific events about which the process which has generated a particular descriptor may wish to be notified. The per-descriptor interrupt enables 150, on the other hand, allow the process to selectively enable the generation of descriptor-level interrupts upon the happening of any or all of those per-descriptor interrupt conditions 155. Thus, when one of the per-descriptor interrupt conditions 155 occurs, and the per-descriptor interrupt enable 150 relating to that condition is enabled, the per-descriptor interrupt status generator 180 generates an interrupt signal 185, and transmits this and a few bits of interrupt status information 186 relating to the interrupt to the per-virtual circuit interrupter 250 at the next level of the hierarchy.

The per-virtual circuit interrupter 250 controls the generation of interrupts for various conditions which might occur that are specific to a particular virtual circuit. The per-virtual circuit interrupter 250 thus includes an array of per-virtual circuit interrupt conditions 190 and a corresponding array of per-virtual circuit interrupt enables 200, which allow the selective enabling of interrupts upon the happening of any of the interrupt conditions 190.

The per-virtual circuit interrupt conditions 190 include those events about which a process that communicates over a particular virtual circuit might wish to be notified. These might include, for example, an interrupt from the descriptor level of the hierarchy. They might also include the transmission or reception of a packet over a particular virtual circuit, or the occurrence of certain virtual circuit-specific errors. Thus, for example, a process which has repeatedly found no completed descriptors while polling its receive queue may wish to set an interrupt enable related to the reception of a packet over a particular virtual circuit. Then, when a packet is received over that virtual circuit, an interrupt is generated and the process is awakened.

When one of the per-virtual circuit interrupt conditions 190 occurs, and the per-virtual circuit interrupt enable 200 relating to that condition is enabled, the per-virtual circuit interrupt status generator 210 generates an interrupt signal 215 and transmits this and a few bits of interrupt status information 216 regarding the interrupt to the NIC interruptor 270 at the next level of the hierarchy. Included in the interrupt status information 216 passed to the NIC level of the hierarchy by the per-virtual circuit interruptor 250 is a virtual circuit ID, which identifies the particular virtual circuit to which the per-virtual circuit interrupter 250 relates.

Because the generation of an interrupt from the descriptor level of the hierarchy is included among the per-virtual circuit interrupt conditions 190, the per-virtual circuit interrupter 250 acts as a filter for interrupts from the per-descriptor interruptor 290. Through the use of the per-virtual circuit interrupt enable 200 which relates to descriptor level interrupts, the per-virtual circuit interruptor 250 determines whether descriptor level interrupts are passed along to the NIC level of the hierarchy.

The per-descriptor interrupter 290 and per-virtual circuit interruptor 250 together comprise the high-level interrupter 260. For each virtual interface in a node, there are two high-level interrupters 260, one related to the inbound data stream and the other related to the outbound data stream. However, there is only one NIC interruptor 270 per NIC. Thus, if a node contains only a single NIC (as is often the case), it also contains only a single NIC interrupter 270. The interrupts from the potentially thousands of high-level interrupters 90 for a given NIC, therefore, all feed into a single NIC interruptor 105. The virtual circuit ID included in the interrupt status information passed to the NIC interruptor 270 by a per-virtual circuit interrupter 250 identifies which virtual circuit a particular interrupt corresponds to.

The NIC interrupter 270 includes an array of NIC level interrupt conditions 230 and a corresponding array of NIC level interrupt enables 220. The NIC level interrupt conditions might 230 include, for example, interrupts from per-virtual circuit interrupters 250. They might also include error conditions or other events upon the happening of which the driver level NIC software might wish to be notified.

If a NIC level interrupt condition 230 occurs, and the corresponding NIC level interrupt enable 220 is set, the NIC interrupt generator 240 completes an interrupt status word 165. Because the generation of an interrupt from the virtual circuit level of the hierarchy is included among the NIC level interrupt conditions 230, the NIC interrupter 270 acts as a filter for interrupts from the per-descriptor and per-virtual circuit interrupters 290, 250. Through the use of the NIC level interrupt enable 220 which relates to per-virtual circuit interrupts, the NIC interrupter 270 determines whether per-descriptor and per-virtual circuit level interrupts are passed along to the host kernel 10.

Because the hierarchical structure of the NIC interrupt generator allows interrupt status to trickle down from the descriptor level to the virtual circuit level to the NIC level, a given interrupt status word 165 might contain status information relating to interrupts from each of the three levels of the interrupt hierarchy.

Whether the NIC interrupt generator 240 writes the completed interrupt status word 165 to the global interrupt queue 160 in the kernel depends upon the value of an interrupt status queue write enable 145 written to the interrupt control register 280 by the interrupt handler within the host kernel 10. Writes to the global interrupt queue 160 by the NIC interrupt generator 240 will be enabled during normal operation. The ability to disable writes to the global interrupt queue 160 is provided for diagnostic purposes.

Upon completion of the write of an interrupt status word 165 to the global interrupt queue 160, the NIC interrupt generator 240 will generate an interrupt signal 170 to the host kernel 10 if the global interrupt enable 145 is set and if the timer 130 value is zero. The global interrupt enable 145 is controlled by the NIC interrupt handler in the host kernel via the interrupt control register 280 on the NIC 40. If the global interrupt enable 145 is not set (i.e., it is disabled), no interrupts 170 will be generated. If the global interrupt enable 145 is set, but the timer 130 value is non-zero, generation of an interrupt signal 170 is delayed until the timer 130 value reaches zero.

In one embodiment of the present invention, the timer 130 can be used to limit the frequency of interrupts of the operating system kernel by timing a minimum interval between interrupt signals 170. Each time an interrupt signal is generated, the operating system processes all of the interrupt status words 165 in the global interrupt queue 160. In this embodiment, the timer 130 is reset and restarted each time an interrupt signal 170 is generated. Thus, the timer 130 can be used to prevent the host from being overrun with context switches due to interrupts.

In an alternative embodiment of the present invention, the timer 130 can be used to provide a minimum delay from interrupt enables to interrupt signals 170. In this embodiment, the timer 130 is reset and restarted at the time the interrupt signal is re-enabled. Thus, the interval between interrupts may not be regular in this embodiment, but in periods of low or sporadic interrupt volume, greater opportunity is provided for interrupts to be buffered in the global interrupt queue 160 by the delayed restarting of the timer 130.

In both of the above-mentioned embodiments, interrupt status words 165 are buffered in the global interrupt queue 160 while the timer 130 runs. When the timer 130 runs out (i.e., when the timer 130 value is zero), an interrupt signal 170 is transmitted to the host kernel 10 and the host kernel's interrupt handler then processes the entries in the global interrupt queue 160.

Figure 4:
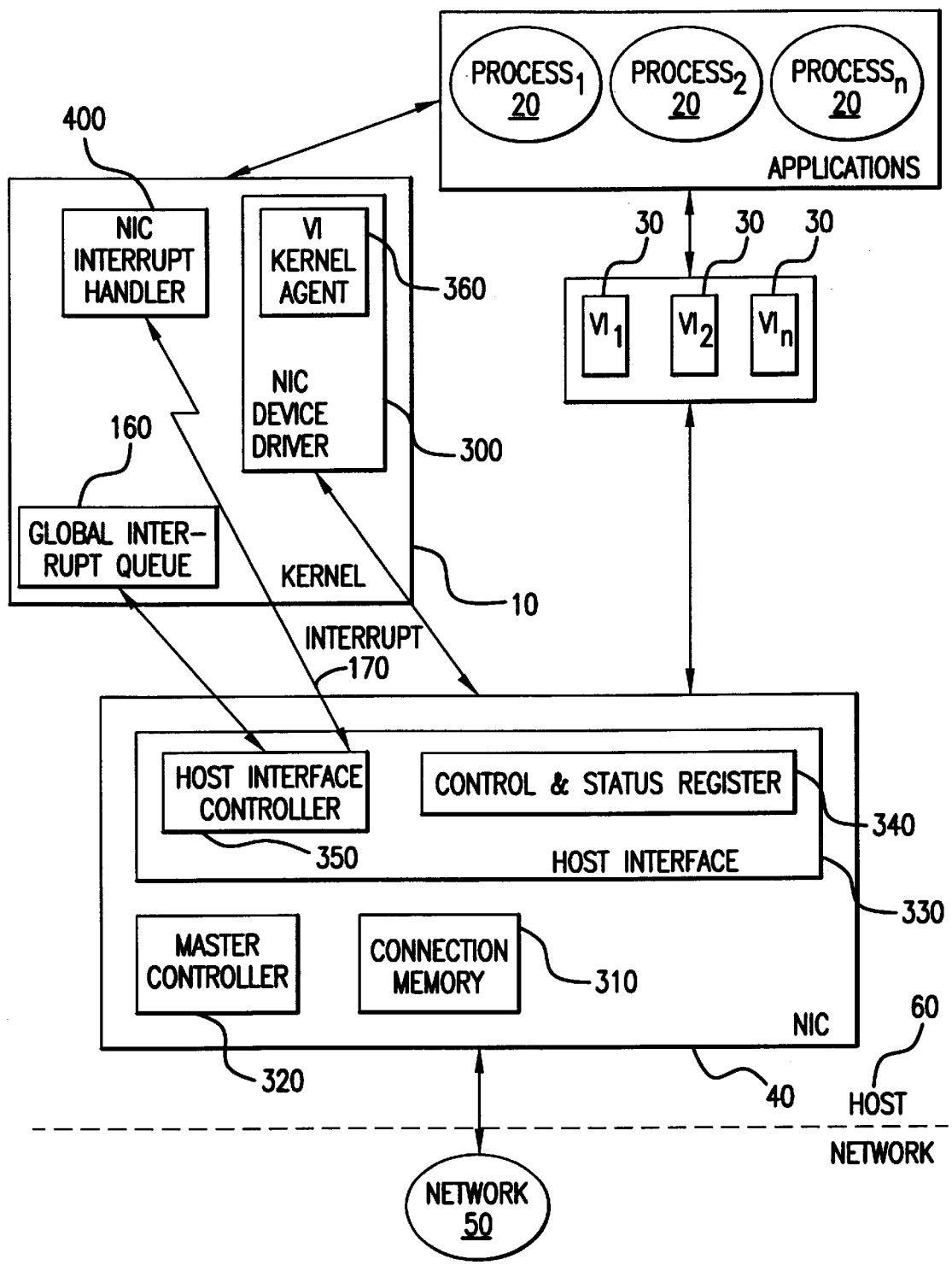
FIG. 4 is a block diagram of various of the elements of the host node involved in performing interrupt generation according to the present invention.

FIG. 4 is a block diagram of various of the elements of the host node involved in implementing the hierarchical interrupt generation structure depicted in FIG. 3. Referring to FIGS. 3 and 4, per-descriptor and per-virtual circuit interrupt conditions 155, 190, for each data stream direction of each virtual circuit 35, are stored as context data in connection memory 310 on the NIC 40. Per-descriptor interrupt enables 150 are selectively set and passed, in each descriptor sent via a virtual interface 30, by a process 20 to the NIC 40 where they are stored in connection memory 310 with the other context data for the associated virtual circuit 35.

Per-virtual circuit interrupt enables 200 for each data stream direction of each virtual circuit 35 are written to the NIC 40 by the virtual interface kernel agent 360 within the NIC device driver 300 of the kernel 10. The per-virtual circuit interrupt enables are selectively enabled by the processes 20 through calls to the virtual interface kernel agent. The NIC 40 stores the per-virtual circuit interrupt enables 200 in a control field in the context connection memory 310 provided for each virtual circuit. The master controller 320 on the NIC 40 implements the per-descriptor interrupt status generator 180 and the per-virtual circuit interrupt status generator 210 for each data stream direction of each virtual circuit, using the control and status information (i.e., the interrupt conditions and enables) stored in connection memory 310.

The storage of per-descriptor and per-virtual circuit interrupt conditions and enables for each direction of each virtual circuit as context information in connection memory allows for the simultaneous management of thousands of per-descriptor interrupters 290 and per-virtual circuit interrupters 250 in a relatively small space within the NIC. This would not be possible if, e.g., hardware registers were used for the storage of these interrupt conditions and enables.

The NIC's host interface 330 implements the NIC interrupter 270. The NIC level interrupt enables 220 are written by the NIC interrupt handler 400 within the operating system kernel 10 to the host interface control and status register 340 in the NIC 40, where they are stored along with the NIC level interrupt conditions 230.

The host interface controller 350 within the NIC 40 implements the NIC interrupt generator 240 functionality. Thus, when a NIC level interrupt condition 230 occurs for which the corresponding interrupt enable 220 is set, and the global interrupt enable 145 is set and the timer 130 value is zero, the NIC interrupt generator 240 transmits an interrupt signal 170 to the interrupt handler 400 within the operating system kernel 10. The interrupt handler then executes a NIC interrupt service routine. The NIC interrupt service routine handles the processing of interrupt status words within the global interrupt queue 160. The interrupt processing functionality of the NIC interrupt handler's interrupt service routine is depicted in FIGS. 5 and 6.

Figure 5:
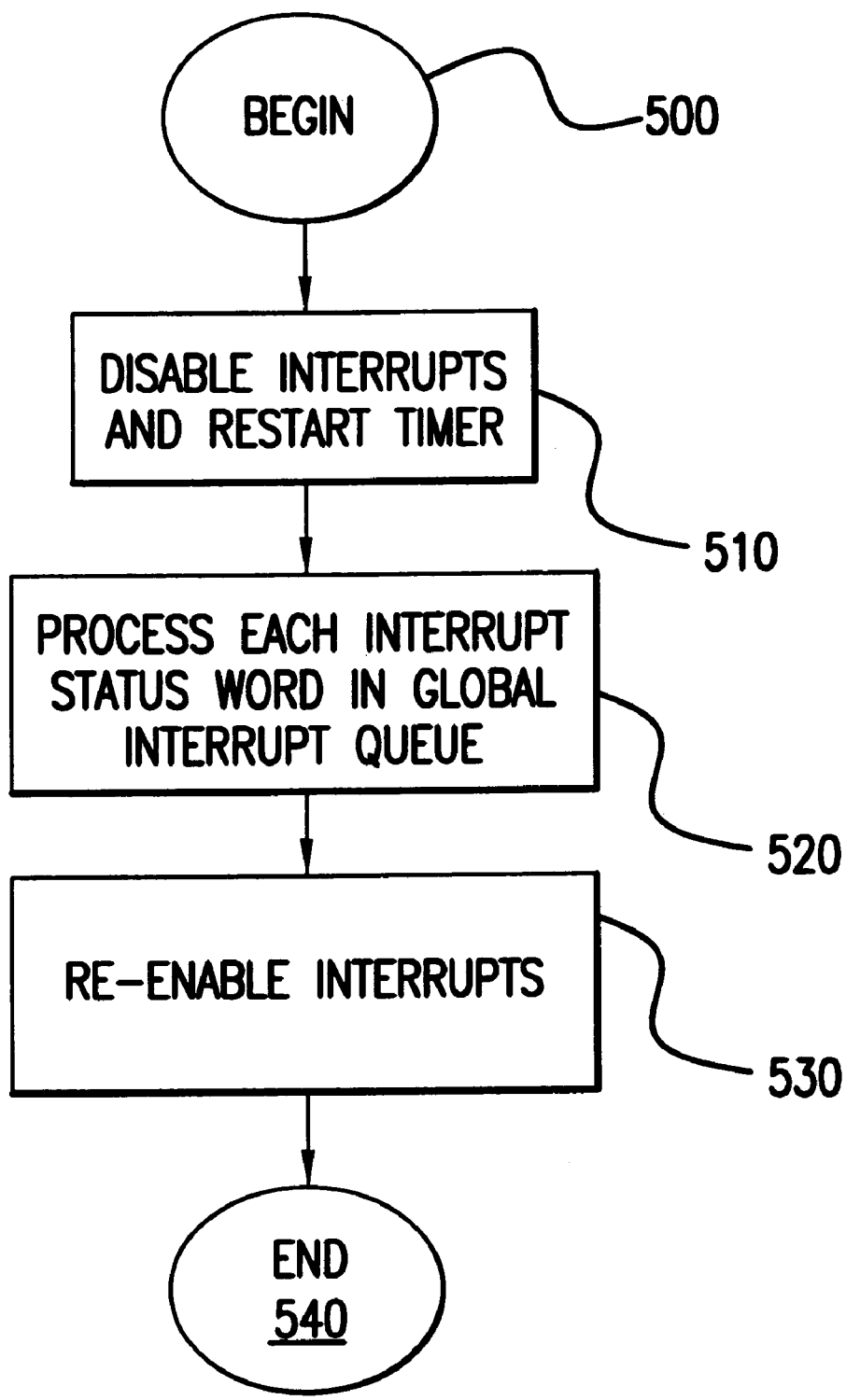
FIG. 5 depicts the methodology performed by the NIC interrupt handler according to an embodiment of the present invention in which a timer is used to generate interrupts at regular intervals.

FIG. 5 depicts the functionality of the interrupt service routine in an embodiment of the present invention in which the timer 130 is used to limit the frequency of successive interrupt signals 170 to the operating system kernel 10. Upon the initiation of the interrupt service routine (step 500) following the generation of an interrupt signal 170 to the interrupt handler 400, further interrupts 170 to the interrupt handler 400 are automatically disabled by the NIC interrupter 400 and the timer is restarted (step 510). The interrupt handler 400 then processes each interrupt status word 165 in the global interrupt queue 160 (step 520). For error-related interrupts, the interrupt handler 400 handles each error as required. For each interrupt generated for the purpose of awakening a host node process 20, the interrupt handler 400 sets an event flag in the kernel 10 which corresponds to that process, using the virtual circuit ID in the interrupt status word 165 to determine which process's event flag to set.

Following processing of all interrupt status words 165 in the global interrupt queue 160, the interrupt handler 400 resets the global interrupt enable 145 (step 530). The interrupt service routine of the interrupt handler 400 then exits (step 540). Once the interrupt service routine exits, the host node's operating system awakens those processes 20 for which event flags have been set.

Figure 6:
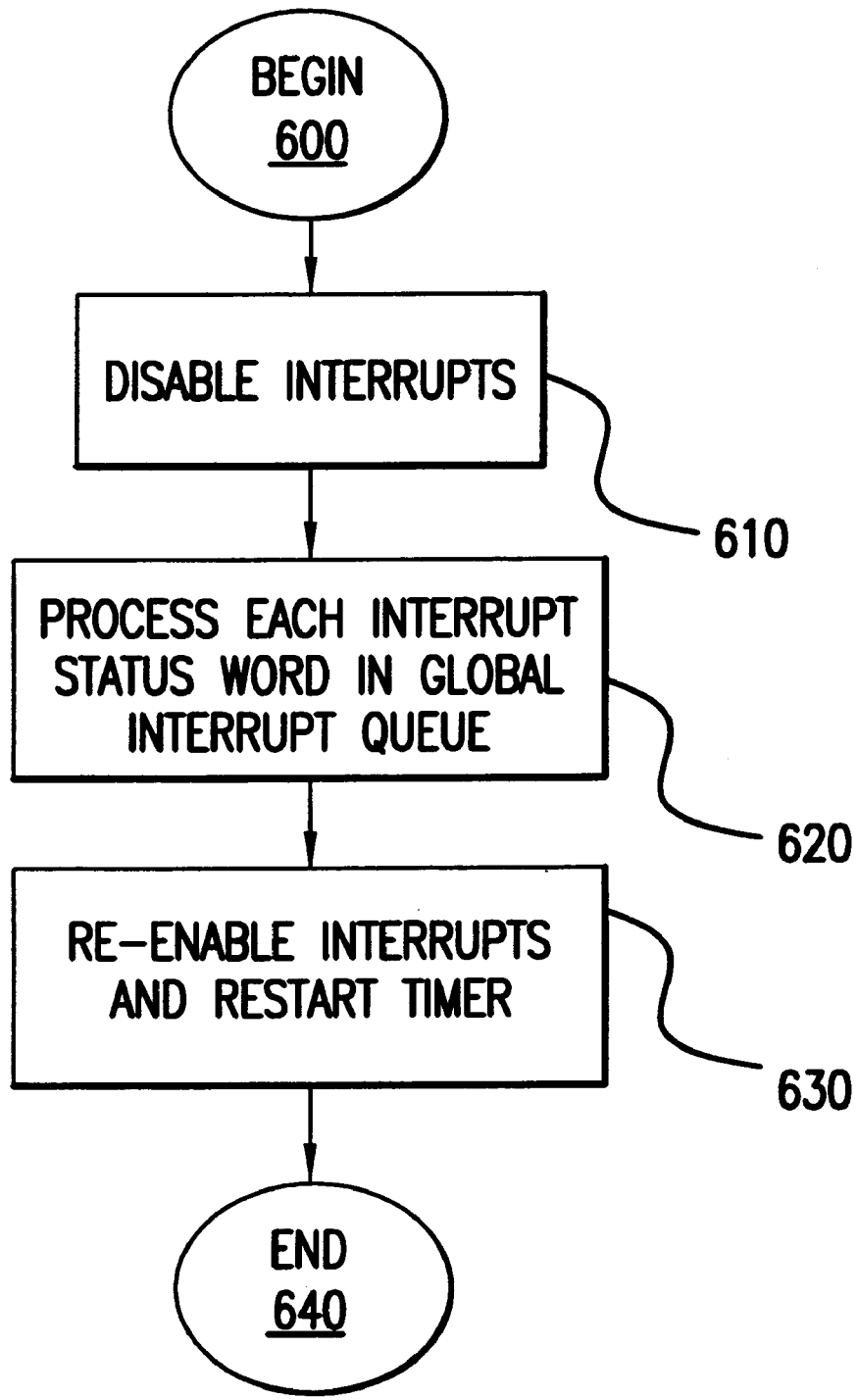
FIG. 6 depicts the methodology performed by the NIC interrupt handler according to an embodiment of the present invention in which a timer is used to provide a minimum delay between successive interrupts.

FIG. 6 depicts the functionality of the interrupt service routine in an embodiment of the present invention in which the timer 130 is used to provide a minimum delay between successive interrupt signals 170 to the operating system kernel 10. Upon the initiation of the interrupt service routine (step 600) following the generation of an interrupt signal 170 to the interrupt handler 400, further interrupts 170 to the interrupt handler 400 are automatically disabled by the NIC interruptor 400 (step 610). The interrupt handler 400 then processes each interrupt status word 165 in the global interrupt queue 160 (step 620). For error-related interrupts, the interrupt handler 400 handles each error as required. For each interrupt generated for the purpose of awakening a host node process 20, the interrupt handler 400 sets an event flag in the kernel 10 which corresponds to that process, using the virtual circuit ID in the interrupt status word 165 to determine which process's event flag to set.

Following processing of all interrupt status words 165 in the global interrupt queue 160, the interrupt handler 400 resets the global interrupt enable 145 and restarts the timer (step 630). The interrupt service routine of the interrupt handler 400 then exits (step 640). Once the interrupt service routine exits, the host node's operating system awakens those processes 20 for which event flags have been set.

What is claimed is:

1. An apparatus to process a plurality of interrupt status words from a network interface controller (NIC) to a plurality of processes, the apparatus comprising:
a per-virtual circuit interrupter having a per-virtual circuit interrupt output to send a first per-virtual circuit interrupt status word and a second per-virtual circuit interrupt status word; and
a NIC interrupter in communication with the per-virtual circuit interrupt output, said NIC interrupter having a NIC interrupt output to send a first NIC interrupt status word and a second NIC interrupt status word to a global interrupt queue of a host system, said NIC interruptor is to generate an interrupt signal to the host system; and
a proxy interrupt handler of the host system in communication with the NIC interruptor, said proxy interrupt handler to awaken at least in part in response to the interrupt signal, read the first NIC interrupt status word and the second NIC interrupt status word from the global interrupt queue, wake the first process and the second process, and send the first NIC interrupt status word to the first process and the second NIC interrupt status word to the second process.

2. The apparatus of claim 1, the apparatus further comprising:
a per-descriptor interrupter in communication with a first process via a first virtual interface and a second process via a second virtual interface, said per-descriptor interruptor having a per-descriptor interrupt output to send a first per-descriptor interrupt status word and a second per-descriptor interrupt status word, the per-descriptor interrupt output in communication with said per-virtual circuit interruptor.

3. The apparatus of claim 1, wherein the NIC interrupter includes an interrupt output delay timer.

4. The apparatus of claim 1, wherein
the per-virtual circuit interrupter includes a first per-virtual circuit interrupt enable and a second per-virtual circuit interrupt enable; and
the NIC interrupter includes a first NIC interrupt enable and a second NIC interrupt enable.

5. The apparatus of claim 2, wherein
the per-descriptor interrupter includes a first per-descriptor interrupt enable and a second per-descriptor interrupt enable;
the per-virtual circuit interruptor includes a first per-virtual circuit interrupt enable and a second per-virtual circuit interrupt enable; and
the NIC interrupter includes a first NIC interrupt enable and a second NIC interrupt enable.

6. The apparatus of claim 5, wherein
the per-descriptor interrupter includes a first per-descriptor interrupt condition and a second per-descriptor interrupt condition;
the per-virtual circuit interruptor includes a first per-virtual circuit interrupt condition and a second per-virtual circuit interrupt condition; and
the NIC interruptor includes a first NIC interrupt condition and a second NIC interrupt condition.

7. The apparatus of claim 6, wherein
the per-descriptor interrupter includes a per-descriptor interrupt status generator and a plurality of per-descriptor memory locations to store the first and second per-descriptor interrupt enables and the first and second per-descriptor interrupt conditions;
the per-virtual circuit interrupter includes a per-virtual circuit interrupt status generator and a plurality of per-virtual circuit memory locations to store the first and second per-virtual circuit interrupt enables and the first and second per-virtual circuit interrupt conditions; and
the NIC interrupter includes a NIC interrupt status generator and a NIC interrupt control register to store the first and second NIC interrupt enables and the first and second NIC interrupt conditions.

8. The apparatus of claim 6, further comprising connection memory to store the first and second per-descriptor interrupt enables, the first and second per-descriptor interrupt conditions, the first and second per-virtual circuit interrupt enables, and the first and second per-virtual circuit interrupt conditions as context information.

9. A method of processing a plurality of interrupt status words from a network interface controller (NIC) to a plurality of processes, the method comprising:
outputting a first per-virtual circuit interrupt status word and a second per-virtual circuit interrupt status word;
outputting a first NIC interrupt status word and a second NIC interrupt status word to a global event queue in a host system, the outputting based at least in part on receiving the first per-virtual circuit interrupt status word and the second per-virtual circuit interrupt status word;
generating an interrupt signal to the host system to wake a proxy interrupt handler; and
reading the first NIC interrupt status word and the second NIC interrupt status word from the global event queue, waking a first process and a second process, and sending the first NIC interrupt status word to the first process and the second NIC interrupt status word to the second process.

10. The method of claim 9, the method further comprising:
outputting a first per-descriptor interrupt status word based at least in part on processing of a first descriptor received from a first process via a first virtual interface; and
outputting a second per-descriptor interrupt status word based at least in part on processing of a second descriptor received from a second process via a second virtual interface,
the outputting a first per-virtual circuit interrupt status word being based at least in part on receiving the first per-descriptor interrupt status word, the outputting a second per-virtual circuit interrupt status word being based at least in part on receiving the second per-descriptor interrupt status word.

11. The method of claim 10, the method further comprising:
receiving a first per-descriptor interrupt enable from the first process via the first virtual interface and a second per-descriptor interrupt enable from the second process via the second virtual interface.

12. An apparatus to process a plurality of interrupt status words from a network interface controller (NIC) to a plurality of processes, the apparatus comprising:
a NIC interrupter having a NIC interrupt output to send a first NIC interrupt status word output and a second NIC interrupt status word output, said NIC interrupter to generate an interrupt signal;
a global interrupt queue to receive the first NIC interrupt status word and the second NIC interrupt status word; and a proxy interrupt handler to awaken based at least in part in response to the interrupt signal, read the first and second NIC interrupt status words from said global interrupt queue, wake a first process and a second process, and send the first NIC interrupt status word to the first process and the second NIC interrupt status word to the second process.

13. The apparatus of claim 12, the apparatus further comprising:

a per-virtual circuit interrupter having a per-virtual circuit interrupt output to send a first per-virtual circuit interrupt status word and a second per-virtual circuit interrupt status word, the per-virtual circuit interrupt output in communication with said NIC interrupter.

14. The apparatus of claim 13, the apparatus further comprising a per-descriptor interruptor in communication with the first process via a first virtual interface and the second process via a second virtual interface, said per-descriptor interrupter having a per-descriptor interrupt output to send a first per-descriptor interrupt status word and a second per-descriptor interrupt status word, the per-descriptor interrupt output in communication with said per-virtual circuit interrupter.

15. The apparatus of claim 14, wherein the per-descriptor interruptor is to send the first per-descriptor interrupt status word based at least in part on processing of a first descriptor received from the first process via the first virtual interface, and the per-descriptor interruptor is to send the second per-descriptor interrupt status word based at least in part on processing of a second descriptor received from the second process via the second virtual interface.

16. The apparatus of claim 15, wherein the per-virtual circuit interruptor is to send the first per-virtual circuit interrupt status word based at least in part on receiving the first per-descriptor interrupt status word, and the per-virtual circuit interruptor is to output the second per-virtual circuit interrupt status word based at least in part on receiving the second per-descriptor interrupt status word.

17. A method of processing a plurality of interrupt status words from a network interface controller (NIC) to a plurality of processes, the method comprising:

receiving a first NIC interrupt status word and a second NIC interrupt status word;

receiving an interrupt signal;

reading the first NIC interrupt status word and the second NIC interrupt status word from a global event queue;

waking a first process and a second process; and sending the first NIC interrupt status word to the first process and the second NIC interrupt status word to the second process.

18. The method of claim 17, the method further comprising:

sending a first per-virtual circuit interrupt status word and a second per-virtual circuit interrupt status word; and sending the first NIC interrupt status word and the second NIC interrupt status word based at least in part on receiving the first per-virtual circuit interrupt status word and the second per-virtual circuit interrupt status word.

19. The method of claim 18, wherein sending a first per-descriptor interrupt status word and a second per-descriptor interrupt status word, said sending a first per-virtual circuit interrupt status word and a second per-virtual circuit interrupt status word is based at least in part on receiving the first per-descriptor interrupt status word and the second per-descriptor interrupt status word.

20. The method of claim 19, wherein sending a first per-descriptor interrupt status word is based at least in part on processing a first descriptor received from the first process via a first virtual interface, and sending a second per-descriptor interrupt status word is based at least in part on processing a second descriptor received from the second process via a second virtual interface.

21. The method of claim 20, the method further comprising:

receiving a first per-descriptor interrupt enable from the first process via the first virtual interface and a second per-descriptor interrupt enable from the second process via the second virtual interface.

22. A data communication system, comprising:

a network; and a host node coupled to said network, the host node including memory, an operating system kernel stored in the memory, and a network interface controller (NIC) coupled to the operating system kernel, the NIC including a NIC interruptor having a NIC interrupt output to send a first NIC interrupt status word output and a second NIC interrupt status word output, said NIC interrupter to generate an interrupt signal, a global interrupt queue to receive the first NIC interrupt status word and the second NIC interrupt status word, and a proxy interrupt handler to awaken based at least in part in response to the interrupt signal, read the first and second NIC interrupt status words from said global interrupt queue, wake a first process and a second process, and send the first NIC interrupt status word to the first process and the second NIC interrupt status word to the second process.

* * * * *